United States Patent
Brown et al.

(10) Patent No.: US 12,344,966 B2
(45) Date of Patent: Jul. 1, 2025

(54) METHOD OF MAKING AN ELONGATED ENCLOSED PATHWAY

(71) Applicant: Milliken & Company, Spartanburg, SC (US)

(72) Inventors: Stacey Brown, LaGrange, GA (US); Steven L. Bedingfield, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 18/670,130

(22) Filed: May 21, 2024

(65) Prior Publication Data

US 2024/0401250 A1    Dec. 5, 2024

Related U.S. Application Data

(60) Provisional application No. 63/505,444, filed on Jun. 1, 2023.

(51) Int. Cl.
*B32B 1/08* (2006.01)
*B32B 5/02* (2006.01)
(Continued)

(52) U.S. Cl.
CPC ............... *D03D 1/02* (2013.01); *B32B 1/08* (2013.01); *B32B 5/024* (2013.01); *B32B 27/12* (2013.01);
(Continued)

(58) Field of Classification Search
CPC .......... D03D 1/02; D03D 3/02; D03D 13/004; D03D 15/283; D03D 15/49; D03D 1/0043;
(Continued)

(56) References Cited

U.S. PATENT DOCUMENTS 1,179,033 A  *  4/1916  Poole .................... B29D 23/24
                                              156/412
3,911,200 A     10/1975  Simons
(Continued)

FOREIGN PATENT DOCUMENTS

CN         1277643         12/2000
CN         1375071         10/2002
(Continued)

OTHER PUBLICATIONS

International Search Report and Written Opinion issued in App. No. PCT/US2024/030544, dated Sep. 17, 2024, 6 pages.
(Continued)

*Primary Examiner* — Robert H Muromoto, Jr.
(74) *Attorney, Agent, or Firm* — Cheryl J. Brickey (57) ABSTRACT

A process of forming an elongated enclosed pathway containing the steps of forming an inner structure containing at least one inflatable tube and forming an outer structure comprising a narrow woven cylinder. The narrow woven cylinder contains a plurality of warp yarns, a plurality of weft yarns, and at least one catch yarn. The weft yarns have a repeating stitch pattern containing a knit stitch with a catch yarn, stitching with the warp yarns in a counterclockwise direction around the circumference, a knit stitch with a catch yarn, and stitching with the warp yarns in a clockwise direction around the circumference. The forming of the narrow woven cylinder is concurrent with inserting the at least one inflatable tube into the narrow woven cylinder and wherein the narrow woven cylinder is woven around the at least one inflatable tube.

13 Claims, 5 Drawing Sheets

(51) Int. Cl.

| | | |
|---|---|---|
| *B32B 27/12* | (2006.01) | |
| *B32B 27/32* | (2006.01) | |
| *B32B 37/24* | (2006.01) | |
| *D03D 1/02* | (2006.01) | |
| *D03D 3/02* | (2006.01) | |
| *D03D 13/00* | (2006.01) | |
| *D03D 15/283* | (2021.01) | |
| *D03D 15/49* | (2021.01) | |
| *F16L 11/08* | (2006.01) | |
| *F16L 11/04* | (2006.01) | |

(52) U.S. Cl.
CPC .............. *B32B 27/32* (2013.01); *B32B 37/24* (2013.01); *D03D 3/02* (2013.01); *D03D 13/004* (2013.01); *D03D 15/283* (2021.01); *D03D 15/49* (2021.01); *F16L 11/085* (2013.01); *B32B 2262/0276* (2013.01); *B32B 2305/188* (2013.01); *B32B 2307/54* (2013.01); *B32B 2307/7242* (2013.01); *B32B 2307/7376* (2023.05); *B32B 2323/04* (2013.01); *B32B 2367/00* (2013.01); *B32B 2571/00* (2013.01); *B32B 2597/00* (2013.01); *D10B 2331/04* (2013.01); *D10B 2505/00* (2013.01); *F16L 2011/047* (2013.01)

(58) Field of Classification Search
CPC ........... B32B 1/08; B32B 5/024; B32B 27/12; B32B 27/32; B32B 37/24; B32B 2262/0276; B32B 2305/188; B32B 2307/54; B32B 2307/7242; B32B 2307/7376; B32B 2323/04; B32B 2367/00; B32B 2571/00; B32B 2597/00; F16L 11/085; F16L 2011/047; D10B 2331/04; D10B 2505/00; D10B 2401/22; D10B 2403/0333; H02G 3/0481
See application file for complete search history.

(56) References Cited

U.S. PATENT DOCUMENTS

| | | | |
|---|---|---|---|
| 3,996,967 A * | 12/1976 | Takada | B29C 49/26 |
| | | | 156/287 |
| 4,281,211 A | 7/1981 | Tatum | |
| 4,582,093 A | 4/1986 | Hubbard | |
| 4,602,763 A | 7/1986 | Gaylin | |
| 4,761,194 A | 8/1988 | Pithouse | |
| 4,862,922 A | 9/1989 | Kite, III | |
| 4,929,478 A | 5/1990 | Conaghan | |
| 5,016,859 A | 5/1991 | Zimmer | |
| 5,027,864 A | 7/1991 | Conti | |
| 5,442,136 A | 8/1995 | Allen | |
| 5,513,149 A | 4/1996 | Salmi | |
| 5,587,115 A | 12/1996 | Allen | |
| 5,789,711 A | 8/1998 | Mark | |
| 5,843,542 A | 12/1998 | Brushafer | |
| 5,969,295 A | 10/1999 | Boucino | |
| 6,145,879 A | 11/2000 | Lowe | |
| 6,178,278 B1 | 1/2001 | Keller | |
| 6,251,201 B1 | 6/2001 | Allen | |
| 6,262,371 B1 | 7/2001 | Allen | |
| 6,304,698 B1 | 10/2001 | Morris | |
| 6,398,190 B1 | 6/2002 | Li | |
| 6,421,485 B2 | 7/2002 | Morris | |
| 6,471,440 B1 | 10/2002 | Scheiwiller | |
| 6,571,833 B1 * | 6/2003 | McLarty, III | H02G 9/06 |
| | | | 112/155 |
| 6,718,100 B2 | 4/2004 | Morris | |
| 6,876,797 B2 | 4/2005 | Morris | |
| 6,886,601 B2 | 5/2005 | Allen | |
| 6,963,031 B2 | 11/2005 | Gladfelter | |
| 7,078,615 B2 | 7/2006 | Gladfelter | |
| 7,085,455 B2 | 8/2006 | Morris | |
| 7,085,458 B2 | 8/2006 | Morris | |
| 7,174,074 B2 | 2/2007 | Morris | |
| 7,319,802 B2 | 1/2008 | Morris | |
| 7,512,668 B2 * | 3/2009 | Koegel | G06Q 10/10 |
| | | | 709/219 |
| 7,621,505 B2 * | 11/2009 | Hamrick | H02G 1/086 |
| | | | 254/134.3 FT |
| 7,754,971 B2 * | 7/2010 | Bedingfield | G02B 6/545 |
| | | | 174/117 M |
| 7,799,997 B2 | 9/2010 | Bedingfield | |
| 7,873,028 B2 * | 1/2011 | Lam | H04L 63/10 |
| | | | 370/352 |
| 8,387,954 B2 * | 3/2013 | Allen | H02G 1/086 |
| | | | 385/100 |
| 8,809,682 B2 * | 8/2014 | Hepfinger | H02G 9/065 |
| | | | 385/100 |
| 9,362,725 B2 * | 6/2016 | Morris | H05K 9/0098 |
| 9,577,840 B2 | 2/2017 | Lam | |
| 10,254,498 B2 | 4/2019 | Bedingfield | |
| 10,829,874 B2 | 11/2020 | Bedingfield | |
| 11,008,680 B2 | 5/2021 | Bedingfield | |
| 11,913,593 B2 * | 2/2024 | Bedingfield | D03D 1/02 |
| 2003/0015248 A1 | 1/2003 | Itoh | |
| 2003/0123824 A1 * | 7/2003 | Tatarka | G02B 6/441 |
| | | | 385/113 |
| 2003/0142933 A1 | 7/2003 | Morris | |
| 2003/0183291 A1 * | 10/2003 | Allen | H02G 7/16 |
| | | | 138/116 |
| 2003/0185527 A1 * | 10/2003 | Morris | G02B 6/4459 |
| | | | 385/100 |
| 2004/0033035 A1 | 2/2004 | Morris | |
| 2004/0081411 A1 * | 4/2004 | Gladfelter | H02G 3/0487 |
| | | | 385/100 |
| 2005/0047735 A1 | 3/2005 | Morris | |
| 2005/0185902 A1 * | 8/2005 | James | G02B 6/4459 |
| | | | 385/100 |
| 2005/0198798 A1 | 9/2005 | Barker | |
| 2006/0016507 A1 * | 1/2006 | Baer | H02G 15/18 |
| | | | 139/383 R |
| 2006/0117807 A1 * | 6/2006 | Reiter | D04B 21/10 |
| | | | 66/196 |
| 2007/0003723 A1 * | 1/2007 | Limpens | B29C 66/1122 |
| | | | 156/289 |
| 2008/0054236 A1 * | 3/2008 | Morris | H02G 9/06 |
| | | | 254/134.4 |
| 2008/0264669 A1 * | 10/2008 | Bedingfield | H02G 3/0406 |
| | | | 174/99 R |
| 2009/0218002 A1 * | 9/2009 | Kashihara | D03D 1/0043 |
| | | | 139/384 R |
| 2012/0073854 A1 * | 3/2012 | Allen | H02G 3/0487 |
| | | | 174/68.1 |
| 2012/0132309 A1 * | 5/2012 | Morris | D03D 13/008 |
| | | | 139/420 R |
| 2012/0187271 A1 * | 7/2012 | Komiya | F16L 3/015 |
| | | | 248/634 |
| 2017/0145603 A1 * | 5/2017 | Bedingfield | D99Z 99/00 |
| 2020/0208759 A1 * | 7/2020 | Iaciofano | D03D 1/0043 |
| 2023/0226773 A1 * | 7/2023 | Chau | B25J 9/0015 |
| | | | 156/91 |

FOREIGN PATENT DOCUMENTS

| | | |
|---|---|---|
| CN | 1679120 | 10/2005 |
| CN | 101548216 | 9/2009 |
| CN | 102007239 | 4/2011 |
| CN | 102560802 | 7/2012 |
| CN | 102611045 | 7/2012 |
| CN | 106995969 | 8/2017 |
| CN | 206502927 | 9/2017 |
| CN | 211151396 | 7/2020 |
| CN | 213476233 U | 6/2021 |
| DE | 10204019 | 8/2003 |
| DE | 102012100359 | 7/2012 |
| EP | 0045212 | 4/1984 |
| EP | 0225152 A2 | 6/1987 |
| EP | 1254980 | 11/2002 |

(56) References Cited

FOREIGN PATENT DOCUMENTS

| | | |
|---|---|---|
| EP | 1385246 | 1/2004 |
| GB | 2084505 | 5/1984 |
| JP | 2005116534 | 4/2005 |
| KR | 200473979 | 8/2014 |
| WO | 0209249 A1 | 1/2002 |
| WO | 03092134 A1 | 11/2003 |
| WO | 2004020888 | 3/2004 |
| WO | 2008027467 A1 | 3/2008 |
| WO | 2008070819 | 6/2008 |
| WO | 2010015872 A1 | 2/2010 |

OTHER PUBLICATIONS

International Search Report and Written Opinion issued in App. No. PCT/US2022/079872, mailing date Mar. 14, 2023, 16 pages.

* cited by examiner

METHOD OF MAKING AN ELONGATED ENCLOSED PATHWAY

RELATED APPLICATIONS

This application claims priority to Provisional Patent Application 63/505,444, filed on Jun. 1, 2023, which is herein incorporated by reference in its entirety.

TECHNICAL FIELD OF THE INVENTION

The present invention is directed towards textile structures especially for us in conduit systems and hoses.

BACKGROUND

Elongated enclosed pathway structures have chambers and are used within conduits to help segregate individual cables into compartments or channels within the innerduct, to maximize the number of cables that may be positioned in a conduit, and to facilitate insertion of cables into the conduit by preventing cable-against-cable friction and providing a tape or rope inside each compartment of the innerduct.

To form more than one chamber in an innerduct structure, typically a seam is used to attach the layers together (this could be multiple pieces of textile, a textile folded onto itself, or a combination of both). In some applications, cables are pulled through the innerduct chambers, but in other applications it is preferably to blow the cables into the chambers. To be able to blow into the innerduct, the chamber needs to be air impermeable (or essentially air impermeable) and strong enough not to burst under the blowing pressure.

It is desirable to have an elongated enclosed pathway that allows the innerduct and/or cables in the innerduct to be blown into the conduit using air or another compressed gas in addition to being able to be pulled or pushed into the conduit/innerduct.

BRIEF SUMMARY OF THE INVENTION

In one embodiment, the invention relates to an elongated enclosed pathway containing an outer structure being a narrow woven cylinder and an inner structure being an inflatable tube located within the narrow woven cylinder. The narrow woven cylinder contains a plurality of warp yarns, a plurality of weft yarns, and at least one catch yarn. The narrow woven cylinder has a knitted catch area running along the length of the cylinder. The weft yarns have a repeating stitch pattern comprising a knit stitch with a catch yarn, stitching with the warp yarns in a counterclockwise direction around the circumference, a knit stitch with a catch yarn, and stitching with the warp yarns in a clockwise direction around the circumference. The inflatable tube has a wall thickness of less than about 0.5 mm. The inflatable tube alone has an air permeability of less than about 1 cfm, the narrow woven cylinder alone has an air permeability of greater than about 100 cfm, and the narrow woven cylinder together with the inflatable tube located inside the narrow woven cylinder has an air permeability of less than about 1 cfm.

The invention also relates to a conduit system of a conduit and an elongated enclosed pathway positioned inside the conduit. An elongated enclosed pathway comprising containing an outer structure being a narrow woven cylinder and an inner structure being an inflatable tube located within the narrow woven cylinder. The narrow woven cylinder contains a plurality of warp yarns, a plurality of weft yarns, and at least one catch yarn. The narrow woven cylinder has a knitted catch area running along the length of the cylinder. The weft yarns have a repeating stitch pattern comprising a knit stitch with a catch yarn, stitching with the warp yarns in a counterclockwise direction around the circumference, a knit stitch with a catch yarn, and stitching with the warp yarns in a clockwise direction around the circumference. The inflatable tube has a wall thickness of less than about 0.5 mm. The inflatable tube alone has an air permeability of less than about 1 cfm, the narrow woven cylinder alone has an air permeability of greater than about 100 cfm, and the narrow woven cylinder together with the inflatable tube located inside the narrow woven cylinder has an air permeability of less than about 1 cfm.

The invention also relates to a process of forming an elongated enclosed pathway. The process includes forming an inner structure being an inflatable tube with a wall thickness of less than about 0.5 mm and forming an outer structure being a narrow woven cylinder. The narrow woven cylinder contains a plurality of warp yarns, a plurality of weft yarns, and at least one catch yarn The narrow woven cylinder contains a knitted catch area running along the length of the tube. The weft yarns have a repeating stitch pattern comprising a knit stitch with a catch yarn, stitching with the warp yarns in a counterclockwise direction around the circumference, a knit stitch with a catch yarn, and stitching with the warp yarns in a clockwise direction around the circumference. The forming of the narrow woven cylinder is concurrent with inserting the at least one inflatable tube into the narrow woven cylinder and the narrow woven cylinder is woven around the at least one inflatable tube. The inflatable tube alone has an air permeability of less than about 1 cfm, the inflatable tube alone has an air permeability of greater than about 100 cfm, and the narrow woven cylinder together with an inflatable tube located inside the narrow woven cylinder has an air permeability of less than about 1 cfm.

DETAILED DESCRIPTION

Figure 1:
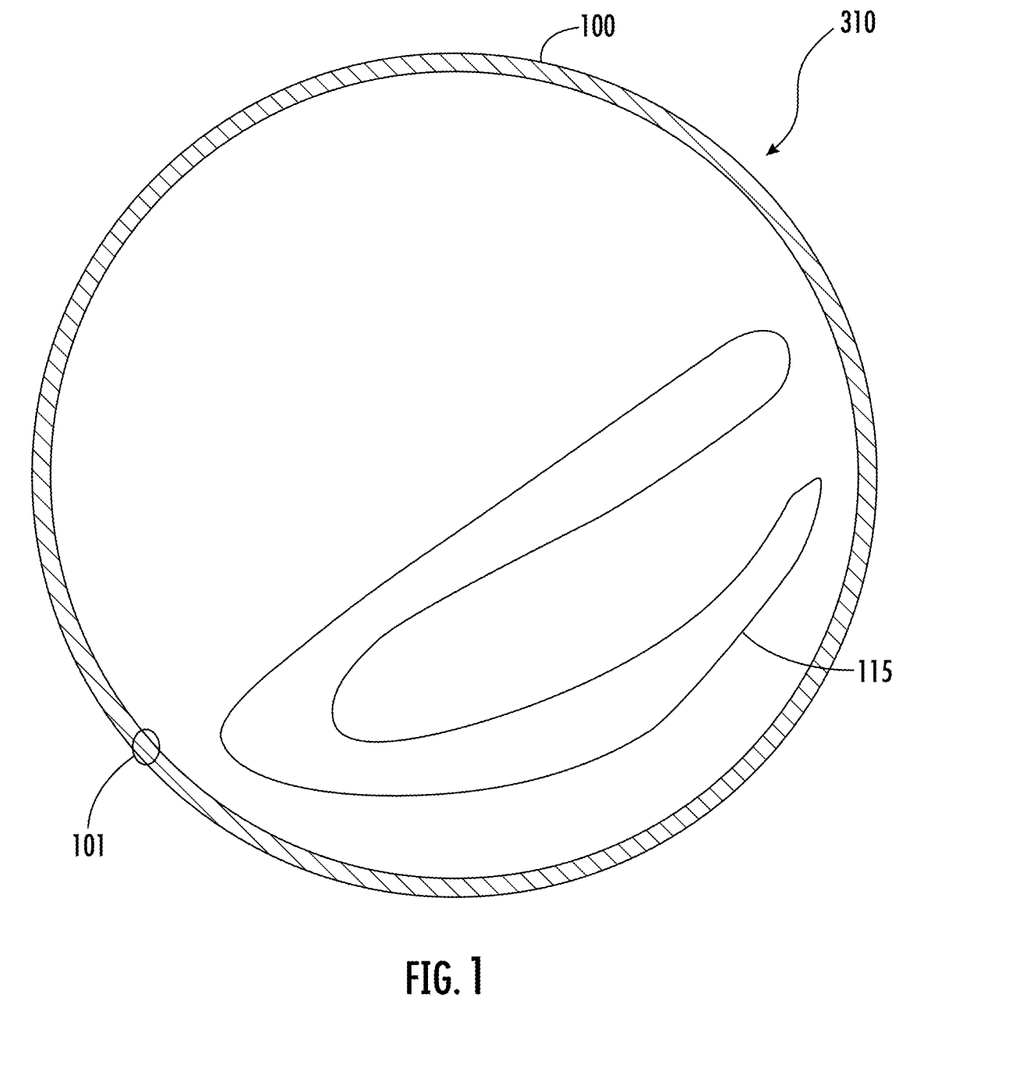
FIG. 1 illustrates one embodiment of the conduit system where the outer structure is a narrow woven cylinder.

Referring to FIG. 1, there is shown one embodiment for the elongated enclosed pathway 310. The advantages of this elongated enclosed pathway over previous inventions and products is that it is flexible, collapsible, and a very low weight.

The elongated enclosed pathway 310 contains an outer structure 100 and an inner structure 115. The outer structure 300 has a circumference, a diameter, and a length. Typically, the length of the outer structure 100 is much larger than the diameter, typically at least about 1,000 times the diameter (the length of the structure 100 being hundreds or thousands of feet).

In one embodiment beneficial to smaller conduits, the outer structure 100 has a diameter of less than about 100 mm, more preferably less than about 75 mm, more preferably less than about 50 mm. The diameter is measured when the structure is in a round, not flattened state. In one embodiment, the diameter of the outer structure 100 is less than about 35 mm, more preferably less than about 30 mm. In another embodiment, the diameter of the outer structure 100 is greater than 5 mm, more preferably between about 5 and 30 mm, more preferably between about 10 and 22 mm.

Figure 2:
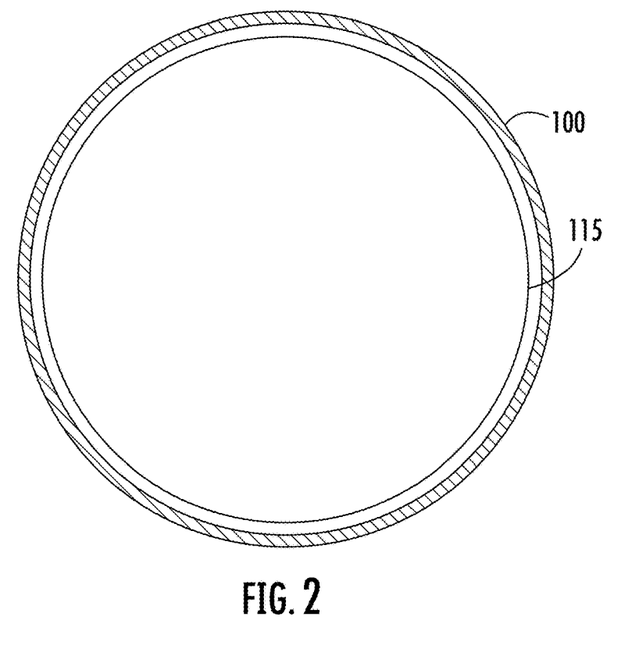
FIGS. 2 and 3 illustrate the relationship between the outer and inner structures during installation and use.
Figure 3:
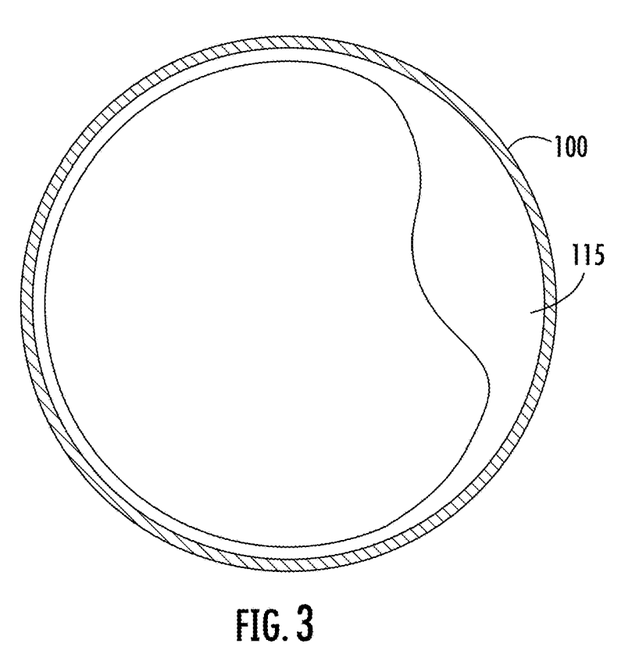

FIG. 2 illustrates what the elongated enclosed pathway 310 looks like when air is introduced into the inner structure 115. The inner structure 115 expands or opens to fill the outer structure 100 and the outer structure 100 constrains the inner structure 115, providing burst strength to the inner structure 115 and preventing it from popping. FIG. 3 illustrates the elongated enclosed pathway 310 after air pressure is released from the elongated enclosed pathway 310. In this case, the inner structure 115 may stay against the inner surface of the outer structure 100 or may contract/shrink/fold back away from the outer structure 100.

The outer structure 100 contains a narrow woven cylinder. This can also be referred to as a narrow woven cylinder, but for this application it is referred to as a cylinder to avoid confusion with the inflatable tube. The narrow woven cylinder and provides the strength to the elongated enclosed pathway structure. The narrow woven cylinder contains a plurality of warp yarns, a plurality of weft yarns, and at least one catch yarn.

The yarns in the narrow woven cylinder may be any suitable yarn. The selection of the types, sizes, and comparisons of each of the yarns in the woven textile contribute the end products of the narrow woven cylinder. "Yarn", in this application, as used herein includes a monofilament elongated body, a multifilament elongated body, ribbon, strip, yarn, tape, fiber and the like. The narrow woven cylinder may contain one type of yarn or a plurality of any one or combination of the above. The yarns may be of any suitable form such as spun staple yarn, monofilament, or multifilament, single component, bi-component, or multi-component, and have any suitable cross-section shape such as circular, multi-lobal, square or rectangular (tape), and oval. In a preferred embodiment, the warp yarns are monofilament yarns and the weft yarns and catch yarns are multifilament yarns.

The narrow woven cylinder can be formed from a single plurality or type of yarn (e.g., the textile can be formed solely from yarns comprising a blend of cellulosic fibers and synthetic fibers, such as polyamide fibers), or the textile can be formed from several pluralities or different types of yarns (e.g., the textile can be formed from a first plurality of yarns comprising cellulosic fibers and polyamide fibers and a second plurality of yarns comprising an inherent flame resistant fiber). The yarns may be formed of (but are not limited to) cellulosic fibers (such as cotton, rayon, linen, jute, hemp, cellulose acetate, and combinations, mixtures, or blends thereof), polyester fibers (e.g., poly(ethylene terephthalate) fibers, poly(propylene terephthalate) (PET) fibers, poly(trimethylene terephthalate) fibers), poly(butylene terephthalate) fibers, and blends thereof), polyamide fibers (e.g., nylon 6 fibers, nylon 6,6 fibers, nylon 4,6 fibers, and nylon 12 fibers), polyvinyl alcohol fibers, an elastic polyester-polyurethane copolymer (SPANDEX®), flame-resistant meta-aramid (NOMEX®) and combinations, mixtures, or blends thereof. Certain embodiments of the textile of the invention contain yarns comprising inherent flame resistant fibers. As utilized herein, the term "inherent flame resistant fibers" refers to synthetic fibers which, due to the chemical composition of the material from which they are made, exhibit flame resistance without the need for an additional flame retardant treatment. In such embodiments, the inherent flame resistant fibers can be any suitable inherent flame resistant fibers, such as polyoxadiazole fibers, polysulfonamide fibers, poly(benzimidazole) fibers, poly(phenylenesulfide) fibers, meta-aramid fibers, para-aramid fibers, polypyridobisimidazole fibers, polybenzylthiazole fibers, polybenzyloxazole fibers, melamine-formaldehyde polymer fibers, phenol-formaldehyde polymer fibers, oxidized polyacrylonitrile fibers, polyamide-imide fibers and combinations, mixtures, or blends thereof. In certain embodiments, the inherent flame resistant fibers are preferably selected from the group consisting of polyoxadiazole fibers, polysulfonamide fibers, poly(benzimidazole) fibers, poly(phenylenesulfide) fibers, meta-aramid fibers, para-aramid fibers, and combinations, mixtures, or blends thereof.

In a preferred embodiment, the warp yarns are monofilament yarns. Monofilament yarns may be preferred because of their lower amount of crimp in a woven textile (as compared to a multifilament yarn) and so the monofilament yarns have less elongation as an innerduct would be pulled through a conduit. By way of example, the warp yarns may be selected from polyesters, polyolefins, such as polypropylene, polyethylene and ethylene-propylene copolymers, and polyamides, such as nylon and aramid, e.g., Kevlar®. Yarns having a peak elongation at peak tensile load of 45% or less, preferably 30% or less, are preferred. Monofilament yarns, including bi- and multi-component yarns, have been found to be particularly useful in innerduct applications. These materials have been found to impart desired properties to the woven textile. In one embodiment, all of the warp yarns are PET monofilament yarns as PET monofilament yarns have a good balance of properties versus cost.

By selecting warp yarns having a relatively low elongation at peak tensile load, it is possible to minimize lengthwise elongation of the innerduct structure during installation of the innerduct in a conduit, thereby avoiding "bunching" of the innerduct. Additionally, the elongation potential in the warp direction of the textile incorporated into an innerduct can be minimized by reducing the warp crimp during the weaving process. For example, the warp crimp may be reduced by increasing the tension on the warp yarns during weaving to achieve a warp crimp of less than 5%, as measured by ASTM D3883-Standard Test Method for Yarn Crimp and Yarn Take-Up in Woven Textiles. Reducing the warp crimp in the textile, especially a plain weave textile, results in an increase in the crimp of the filling yarn, which has the further advantage of increasing the seam strength along the longitudinal edges of the sections of textile used to construct the innerduct.

In one embodiment, warp yarns having a denier of from 350 to 1,200, preferably 400 to 750, may be employed. The end count (yarns per inch in the warp) typically range from 25 to 75 ends per inch, preferably from 35 to 65 ends per inch. In one embodiment of the invention a plain weave textile having 35 to 65 ends per inch of 400 to 750 denier monofilament polyester warp yarns is provided.

The weft yarns may be any suitable yarn including polyesters, polyolefins, such as polypropylene, polyethylene and ethylene-propylene copolymers, and polyamides, such as nylon and aramid, e.g., Kevlar®, and mixtures thereof. Yarns having a peak elongation at peak tensile load of 45% or less, preferably 30% or less, are preferred.

The terms "pick," "picks," "picks per inch" and "ppi" are intended to refer to (a) one filling yarn carried through a shed formed during the weaving process and interlaced with the warp yarns; and (b) two or more filling yarns carried through a shed during the weaving process, either separately or together, and interlaced with the warp yarns. Thus, for the purposes of determining the picks per inch of a woven textile, multiple-inserted filling yarns are counted as a single pick.

The terms "multiple insertion" and "double insertion" are intended to include (a) multiple filling yarns inserted in the shed of the loom together; (b) multiple filling yarns inserted separately, while the shed of the loom remains the same; and (c) multiple filling yarns inserted separately, where the shed of the looms remains substantially the same, that is, the position of 25% or less of the warp yarns are changed between insertions of the yarns. In one preferred embodiment, at least a portion of the picks of weft yarns are multiple-inserted.

Any suitable weave pattern may be used between the warp and weft yarns. In a preferred embodiment, the weave pattern is a plain weave. Other suitable weave patterns may be used such as when the weft yarns may pass over two or more adjacent warp yarns before transferring to a position below one or more adjacent warp yarns thereby forming a so-called twill weave. Suitable twill weaves include both warp-faced and fill-faced twill weaves, such as 2/1, 3/1, 3/2, 4/1, 1/2, 1/3, or 1/4 twill weaves. The weave may also be, for example, satin, basket-weave, poplin, jacquard, and crepe weave textiles. In one embodiment, the woven textile may contain The textile may contain one weave pattern along the length of the textile or may have different zones of varying weave patterns along the machine direction of the textile.

In one embodiment, the narrow woven cylinder comprises a UV stabilizer. The stabilizer may be compounded or otherwise formed in the yarns, be a coating on the yarns, or a coating on the entire textile. It is slightly counterintuitive to place a UV stabilizer in a product that goes under the ground in a pipe, but it has been found that prior to installation, rolls of innerduct may sit outside in the elements and sun for up to a year before installation. The UV stabilizer serves to protect the physical properties of the textile and innerduct until it is installed and protected from UV sources. UV stabilizers include materials that inhibit photoinitiation (e.g., UV absorbers (UVAs) and excited state quenchers), and materials that inhibit the subsequent oxidative processes (e.g., radical scavengers and alkyl hydroperoxide decomposers). Any suitable UV stabilizer may be used, for example, carbon black, titanium dioxide, and hydrobenzophenone.

The narrow woven cylinder is preferably woven with the weft yarns having the following repeating stitch pattern: at least one knit stitch with a catch yarn, a plurality of stitches with the warp yarns in a counterclockwise direction around the circumference, at least one knit stitch with a catch yarn, and stitching with the warp yarns in a clockwise direction around the circumference. The line along the length of the cylinder that the knitting with the catch yarn(s) form can be seen as 101 in FIG. 1 and in FIG. 6.

The outer woven tube consists of a top woven fabric being of a one-by-one weave and a bottom woven fabric being a one-by-one weave. The formation of the two being that harness 2 and 4 make up the top of the outer tube and harness 3 and 5 make up the bottom of the tube. The top shed opens as harness 2 moves down, when down the weft is inserted, as the top shed closes with harness 2 returning back up, the reed comes forward packing the pick, as harness 5 moves up to open the bottom shed, when up the weft is inserted, after the insertion of the weft harness 5 moves back down closing the bottom shed, the reed moves forward packing the pick, as harness 4 moves down opening the top shed, the weft is inserted, harness 4 moves back up closing the top shed, the reed moves forward packing the pick, harness 3 moves up opening the bottom shed, the weft is inserted, harness 3 moves back down closing the bottom shed, as the reed moves forward packing the pick, this is a four pick repeat. The top and bottom woven fabrics are joined on the receiving side by a catch cord being knitted and on the insertion side by the continuous weft and harness weave. A special heddle eye has been designed to insert the tube between the upper and lower fabric formation sheds.

The elongated enclosed pathway also contains an inner structure which contains at least one inflatable tube. This inner structure comprising an inflatable tube is located within the narrow woven cylinder and provides the air and/or liquid impermeability to the elongated enclosed pathway 310. elongated enclosed pathway 310 of FIG. 1 only contains a single inflatable tube 115, but in other embodiments, elongated enclosed pathway 310 can contain multiple inflatable tubes 115.

Typically, during the weaving process, the inflatable tube 115 is folded, for example, in halves or thirds, to be smaller to make it easier to weave the narrow woven cylinder 100 around the tube 115. Each inner longitudinal structure 115 is located within an outer innerduct textile structure 100.

The inner structure comprises an inflatable tube. This tube may be any suitable inflatable tube, but is preferably air, vapor, and water impermeable, and light weight and flexible. In one embodiment, the inflatable tube is seamless formed from a process such as blow extrusion. In another embodiment, the tube is formed from a narrow plastic sheet that is folded over itself and its edges are attached and sealed together. The edges can be sealed such that the edges align forming a tear drop looking shape to the tube or the edges can be on top of one another such that a more circular cross-sectional shape is created. This adhesion can be formed from a pressure sensitive adhesive, a thermal adhesive, ultrasonic welding, or any other known manufacturing process.

The inflatable tube may be made out of any suitable material including any thermoplastic and thermoset polymers. Preferably, the inflatable tube comprises a thermoplastic polymer. In one embodiment, the polymer is selected from the group consisting of low density polyethylene (LDPE), medium density polyethylene (MDPE), high density polyethylene (HDPE), low low density polyethylene (LLDPE), polypropylene (PP), polyester (PET), polyamide (PA). In one embodiment, the thermoplastic is polyethylene, preferably medium density polyethylene. The materials that form the inflatable tube preferably are airtight (air impermeable), good strength at a low weight, low friction, and low cost. The inflatable tube may contain a single polymer or a blend of polymer, may have additional fillers added into the polymer, and/or have a single layer or be co-extruded and have multiple layers.

It has been found that polyethylene has low coefficient of friction (making it easier for the cable or other elongated member to slide into the tube than compared to a material having a higher coefficient of friction like some urethane elastic type materials). The inflatable tube, in one embodiment, has a wall thickness of between about 0.1 and 1 mm, more preferably less than about 0.5 mm, more preferably less than 0.25 mm. It has been found that this thickness produces an inflatable tube with good physical properties and is cost efficient. The inflatable tube having this thickness has also been shown to be sufficient to withstand (in combination with the outer structure) the typically pressures used in cable and innerduct blowing systems.

The elongated enclosed pathway may contain at least two outer structures, at least one of the outer structures containing at least one innerduct structure. In another embodiment, the elongated enclosed pathway may contain at least three, at least four, or at least five outer structures. These outer structures are preferably attached together, at least during installation into a conduit, to facilitate ease of insertion. The outer structures may be attached using any suitable means, for example staples, stitches, grommets, or adhesive. Grommets are preferred as they create a hole to put a pull line or other rope or thread through and then are easily cut off once the elongated enclosed pathway is in place. Other methods of forming the attachment include riveting the textiles at intervals along the length, ultrasonic welding, or fastening the textile with a hot melt or solvent based adhesive. The textiles of the narrow woven cylinders may also be provided with relatively low temperature melting fibers, which can be melted and allowed to cool, thereby fusing the structure together at the attachment.

Figure 4:
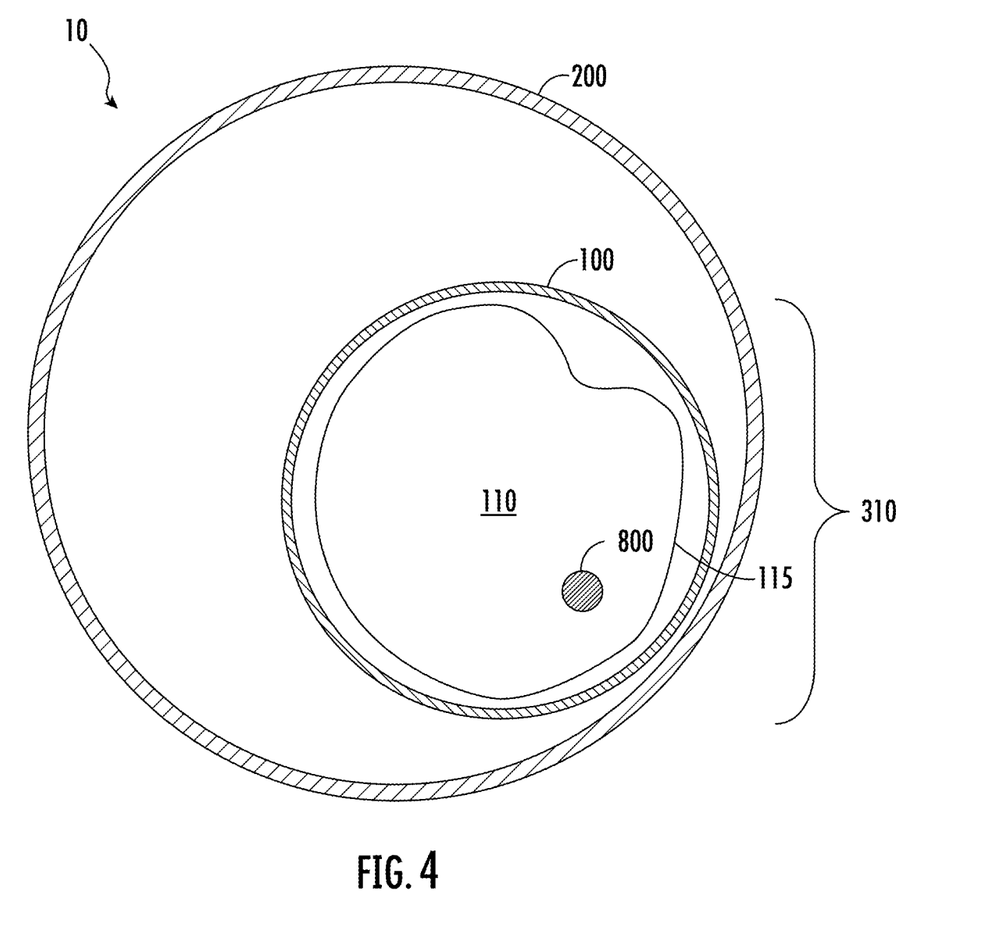
FIG. 4 illustrates a conduit system.

FIG. 4 shows a conduit system 10. The conduit 200 that the innerduct structures are inserted into may be of any suitable size (inner or outer diameter), material, and length. Conduits may also be referred to as ducts, pipes, elongated cylindrical elements, and others. Typically, the conduits 200 are made of a polymer, but other materials such as metal could also be used.

In one embodiment, the conduit 200 is a very small conduit having inner diameter less than about 75 mm, more preferably less than about 60 mm, more preferably less than about 50 mm, more preferably less than about 40 mm, more preferably less than about 35 mm, more preferably less than 33 mm, more preferably less than 30 mm. In another embodiment, the conduit 200 is a medium to large conduit having an inner diameter greater than about 100 mm, more preferably between about 1 and 3 inches, more preferably between about 3 and 10 inches.

The goal of the elongated enclosed pathway is to have the strength and characteristics of an elongated enclosed pathway, while also being mostly impervious to air, vapor, and water so that the elongated enclosed pathway and/or the cables to be placed within the innerduct structure are able to be blown in (or to be used in other applications). Some previous attempts to make a blowable elongated enclosed pathway structure included using a textile with a coating on it. Prototypes using coated textiles tended to fail through air leaks in the stitching (attachment area) or the seam/stitching failing during the blowing test. The combination of the inner structure being an inflatable tube giving the air impermeability and the outer structure being a textile structure giving the strength creates the elongated enclosed pathway. Air permeability is typically measured using ATSM D737. When combined into the elongated enclosed pathway, the inner and outer structure take on the preferred low air permeability.

The inner longitudinal structure (being an inflatable tube) alone has an air permeability of less than about 2 $cm^3/cm^2/s$ (at 10 inches of water column pressure) or 1 cfm, more preferably less than about 1 $cm^3/cm^2/s$ more preferably less than about 0.5 $cm^3/cm^2/s$ (at 10 inches of water column pressure). In another embodiment, the inner longitudinal structure (being an inflatable tube) alone has an air permeability of between about 0 and 0.5 $cm^3/cm^2/s$ (at 10 inches of water column pressure), more preferably between about 0.001 and 0.5 $cm^3/cm^2/s$, or more preferably less than about 0.2 cfm.

The narrow woven cylinder preferably has an open structure meaning that the textile is a porous textile that air, water, and light can easily pass through. Alone, the textile has an air permeability of greater than about 5 $cm^3/cm^2/s$ (at 10 inches of water column pressure), more preferably greater than about 10 $cm^3/cm^2/s$, more preferably greater than about 25 $cm^3/cm^2/s$, preferably greater than 100 cfm, more preferably greater than 200 cfm. In another embodiment, the outer longitudinal structure (being a textile) alone has an air permeability of between about 5 and 200 $cm^3/cm^2/s$ (at 10 inches of water column pressure), more preferably between about 10 and 100 $cm^3/cm^2/s$.

When the inner and the outer structures are combined to form the elongated enclosed pathway (with the inner structure located within the outer structure), the elongated enclosed pathway has an air permeability of less than about 2 $cm^3/cm^2/s$ (at 10 inches of water column pressure), more preferably less than about 1 $cm^3/cm^2/s$ more preferably less than about 0.5 $cm^3/cm^2/s$ (at 10 inches of water column pressure). In another embodiment, the inner and the outer structures combine to form the elongated enclosed pathway (with the inner located within the outer) has an air permeability of between about 0 and 0.5 $cm^3/cm^2/s$ (at 10 inches of water column pressure), more preferably between about 0.001 and 0.5 $cm^3/cm^2/s$. In another embodiment, the inner and the outer structures combine to form the elongated enclosed pathway (with the inner located within the outer) has an air permeability of less than cfm, more preferably less than about 0.2 cfm.

Burst testing was conducted using a custom testing setup. In order is an air regulator, a value, a first pipe, the elongated enclosed pathway to be tested, and a second pipe with the end of the pipe opposite to the innerduct being capped. The elongated enclosed pathway is clamped onto the pipes and pressurized air is added, being increased slowly in steps over time until the elongated enclosed pathway breaks, leaks, or bursts. The maximum psi before the innerduct structure fails (breaks, leaks, or bursts) is considered the burst strength.

In one embodiment, the inner longitudinal structure (being an inflatable tube) alone has a burst strength of less than about 50 psi, more preferably less than about 35 psi. In another embodiment, the inner longitudinal structure (being an inflatable tube) alone has a burst strength of between about 5 and 40 psi, more preferably between about 10 and 25 psi. In another embodiment, the inner longitudinal structure (being an inflatable tube) alone has a burst strength of less than about 75 psi, more preferably less than about 70 psi. In another embodiment, the inner longitudinal structure (being an inflatable tube) alone has a burst strength of between about 25 and 80 psi, more preferably between about 40 and 70 psi.

The outer longitudinal structure (being a narrow woven cylinder) is much stronger. When the inner and the outer structures are combined to form the elongated enclosed pathway (with the inner located within the outer), the elongated enclosed pathway has a burst strength of greater than about 50 psi, more preferably greater than about 60 psi, and in another embodiment between about 55 and 100 psi.

In one embodiment, the polymer forming the inflatable tube has an elongation at break of preferably less than about 50%, more preferably less than about 30%. This contrasts to other tubes that may be more elastic and have elongations at break of 200-300% or more. In other embodiments, the polymer forming the inflatable tube has an elongation at break of preferably greater than about 50%, greater than about 100%, more preferably more than about 200%.

Preferably, the inner structure is movable within the outer structure. This means that the inflatable tube can move relative to the narrow woven cylinder is not permanently attached or is not attached at all to the narrow woven cylinder.

As the outer structure 100 constrains and provides burst strength for the inner structure 115, the relative size of the two structure is important. If the inner longitudinal structure is too small (has too small a diameter), then the inner longitudinal structure will burst or spring a leak as it expands from the air pressure before reaching the inner surface of the outer longitudinal structure. The diameter of the longitudinal structures is measured as the diameter when the structure is completely inflated. In one embodiment, the diameter of the inner longitudinal structure is between about 50 and 200% of the outer longitudinal structure, more preferably between about 60 and 125%, more preferably between about 70 and 120%, more preferably between about 90 and 110%, more preferably between about 95 and 105% or between about 98 and 102%. Matching the diameter of the inner and outer structure is preferred for ease of manufacture, insertion into the conduit, blowing cables into the inner structure, and having the inner structure be supported by the outer structure. The more elastic (stretchy) the inner longitudinal structure is made of smaller the diameter it can be relative to the outer longitudinal structure as it would be able to stretch to the size of the outer longitudinal structure without breaking. In another embodiment, when inflated, the inner longitudinal structure fills at least about 80% of the cross-sectional area of the outer longitudinal structure. In a preferred embodiment, the inner longitudinal structure fills at least about 95% of the cross-sectional area of the outer longitudinal structure, or between about 80 and 100% of the cross-sectional area of the outer longitudinal structure.

FIG. 4 also illustrates some embodiments having cable 800 and and/or a pull tape or rope in them. To draw the fiber optic, coaxial, or other cables through the innerduct structure, it is desirable in one embodiment to provide pull lines for such purpose. The pull lines are positioned within the compartments of the innerduct, preferably before installation of the innerduct within the conduit. By way of example, the pull lines may be tightly woven, relatively flat strips of material or may be a twisted ropes or multi-ply cords having a substantially round cross-section.

The innerduct structure, after it is placed in the conduit (or in other embodiments before it is placed in the conduit) in one embodiment contains a cable 800. Preferably, at least one of the structures of the innerduct structure contains a cable. The cable 800 may be any suitable cable from small or large diameter. In one embodiment, the cable is a mini-cable which has a smaller diameter than traditional cables. Preferably, the mini-cable has a diameter of less than about 15 mm, more preferably less than about 11 mm. The term "cable" is intended to include fiber optic cables, electrical wires, coaxial and triaxial cables, as well as any other line for transmitting electricity and/or electromagnetic signals.

The conduit 10 shown in the Figures may be any suitable conduit, for example, the conduit may be made of metal, synthetic polymer, such as thermoplastic polymer, clay or concrete. The passageway through the conduit may have a round, oval, rectangular, polygonal, or other cross-section shape. The present invention finds utility in combination with virtually any conduit system. Depending upon the relative size of the passageway in the innerduct, typically calculated as the inside diameter, persons skilled in the art may select from the width of the innerduct, number of compartments in each innerduct, and number of individual innerducts, to maximize the capacity of the conduit.

The elongated enclosed pathway is meant to be used in any application where air and water are to be transported in an elongated enclosed pathway. One use would be a blowable elongated enclosed pathway to be placed into conduits for the insertion of cables and the like into conduits. Another use would be a water hose. This invention when not in use rolls up very small and is very light but can be used to transport water under different amounts of pressure.

Example

An elongated enclosed pathway was made according to one aspect of the invention. Air permeability was tested using ASTM D737. Burst testing was conducted using a custom testing setup. In order is an air regulator, a value, a first pipe, the innerduct structure to be tested, and a second pipe with the end of the pipe opposite to the innerduct being capped. The elongated enclosed pathway is clamped onto the pipes and pressurized air is added, being increased slowly in steps over time until the innerduct breaks, leaks, or bursts. The maximum psi before the innerduct structure fails (breaks, leaks, or bursts) is considered to be the burst strength.

Outer structure: A narrow woven fabric cylinder (or tube shape) made having warp yarns and weft yarns. The warp yarns were 520 denier monofilament polyester yarns in a 48 epi construction. The weft yarns were 600 denier multifilament textured polyester yarns in a 24 picks per inch construction. The catch yarns were 600 denier multifilament textured polyester yarns. The pattern of stitching of the weft yarns to create the narrow woven cylinder was a repeating stitch pattern of a knit stitch with a catch yarn, stitching with the warp yarns in a counterclockwise direction around the circumference in a plain weave, a knit stitch with a catch yarn, and stitching with the warp yarns in a clockwise direction around the circumference in the plain weave.

The narrow woven cylinder made in the example had a diameter (with the cylinder being inflated with a cross-sectional shape of approximately a circle) of about 2.5 inches. The air permeability of the fabric was between about 10 and 100 $cm^3/cm^2/s$ at 10 inches of water column pressure.

Inner structure: A plastic tube made from medium density polyethylene (MDPE) and having a nominal wall thickness of about 7 mil (0.18 mm) and a lay flat width of about 1 inch. The air permeability of the plastic tube was about 0 $cm^3/cm^2/s$ at 10 inches of water column pressure. The burst strength of the plastic tube was about 18 psi.

The outer structure was woven at the same time as the plastic inflatable tube was being introduced such that forming of the narrow woven cylinder was concurrent with inserting the inflatable tube into the narrow woven cylinder and the narrow woven cylinder was woven around the inflatable tube.

Figure 5:
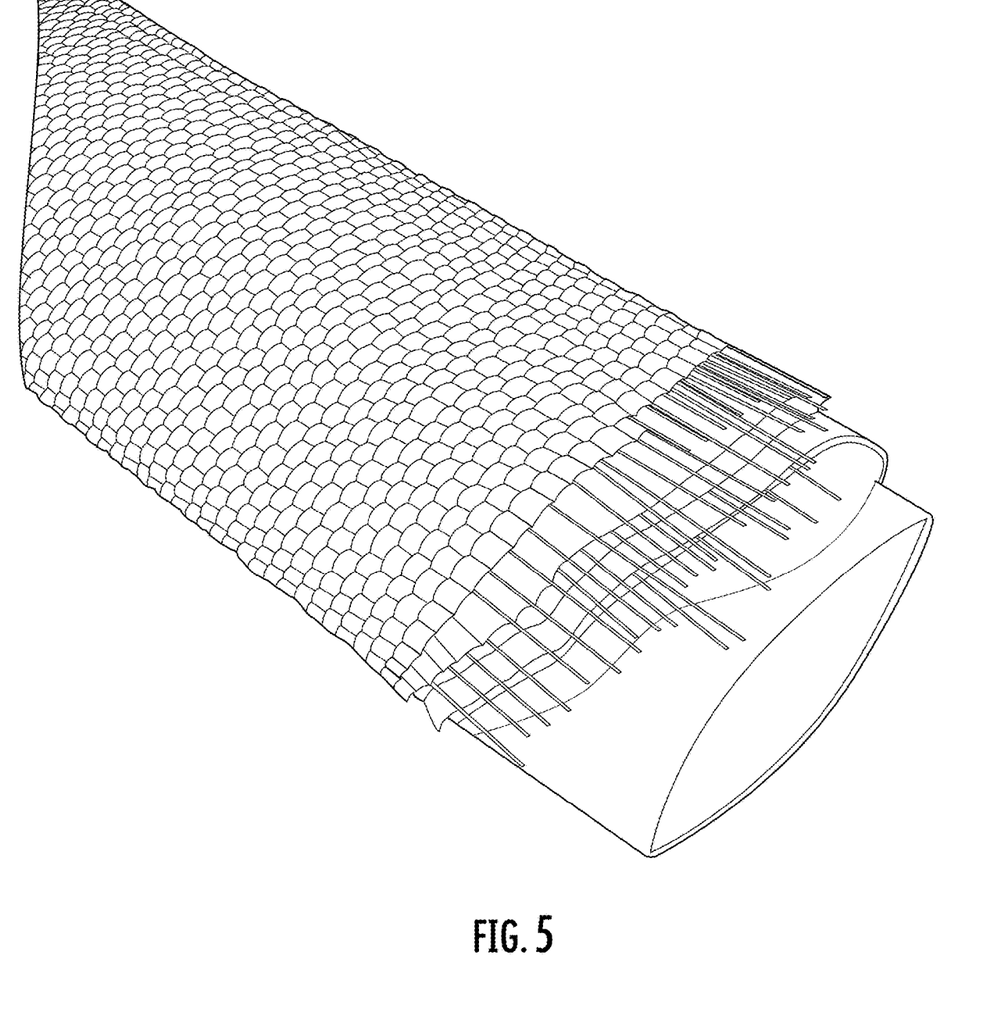
FIG. 5 is a line drawing of one embodiment of the elongated enclosed pathway of example 1.
Figure 6:
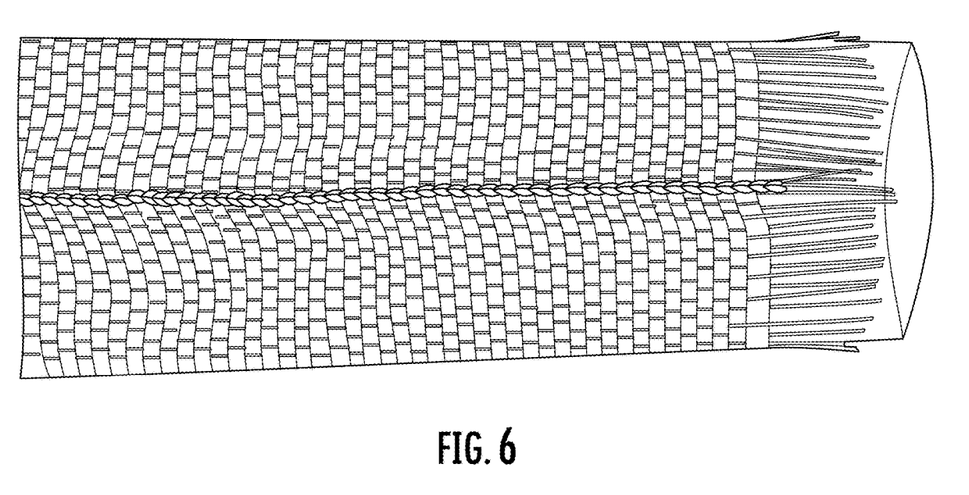
FIG. 6 is a line drawing of one embodiment of the elongated enclosed pathway of example 1 showing the knitted catch area.

Illustrative line drawings of the elongated enclosed pathway made in this example can be seen in FIG. 5 (full elongated enclosed pathway with narrow woven cylinder and inflatable tube being shown and FIG. 6 (close up of outer surface of the narrow woven cylinder with the stitch line formed by the catch yarns being visible).

The air permeability of the outer longitudinal structure with the inner tube inside of it was about 0 $cm^3/cm^2/s$ at 10 inches of water column pressure. The burst strength of the outer longitudinal structure and plastic inflatable tube together was 90 psi.

As one can see from the data above, the combination of the inner longitudinal structure inside of the outer longitudinal structure creates an elongated enclosed pathway with the desired low air permeability and high burst strength as is desired for a blowable elongated enclosed pathway or water hose application.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A process of forming an elongated enclosed pathway comprising:
    forming an inner structure comprising at least one inflatable tube, wherein the inflatable tube has a wall thickness of less than about 0.5 mm;
    forming an outer structure comprising a narrow woven cylinder, wherein the narrow woven cylinder comprises a circumference, a diameter, and a length and comprises a plurality of warp yarns, a plurality of weft yarns, and at least one catch yarn, wherein the narrow woven cylinder comprises a knitted catch area running along the length of the tube, wherein the weft yarns have a repeating stitch pattern comprising a knit stitch with a catch yarn, stitching with the warp yarns in a counterclockwise direction around the circumference, a knit stitch with a catch yarn, and stitching with the warp yarns in a clockwise direction around the circumference;
    wherein the forming of the narrow woven cylinder is concurrent with inserting the at least one inflatable tube into the narrow woven cylinder and wherein the narrow woven cylinder is woven around the at least one inflatable tube;
    wherein the inflatable tube alone has an air permeability of less than about 1 cfm, wherein the inflatable tube alone has an air permeability of greater than about 100 cfm, and the narrow woven cylinder together with an inflatable tube located inside the narrow woven cylinder has an air permeability of less than about 1 cfm.

2. The process of claim 1, wherein the process further comprises inserting the elongated enclosed pathway into a conduit.

3. The process of claim 1, wherein the outer structure has a diameter of less than 30 mm.

4. The process of claim 1, wherein the inner structure has a diameter, wherein the diameter of the inner structure is between about 90 and 110% of the diameter of the outer structure.

5. The process of claim 1, wherein the weft yarns stitching with the warp yarns in the clockwise and counterclockwise directions are plain weave stitches.

6. The process of claim 1, wherein the narrow woven cylinder together with an inflatable tube located inside the narrow woven cylinder has a burst strength of greater than about 60 psi.

7. The process of claim 1, wherein the inflatable tube is movable within the narrow woven cylinder.

8. The process of claim 1, wherein the warp yarns are monofilament yarns and the weft and catch yarns are multifilament yarns.

9. The process of claim 1, further comprising forming an additional outer structure, each outer structure comprising at least one inner structure and attaching the at least two outer structures are attached together.

10. The process of claim 1, wherein the at least two outer structures are attached using an attachment selected from the group consisting of staples, stitches, grommets, and adhesive.

11. The process of claim 1, wherein the elongated enclosed pathway is a blowable elongated enclosed pathway for cables.

12. The process of claim 1, wherein the elongated enclosed pathway is a hose for water.

13. The process of claim 1, further comprising the step of inserting a cable or pull cord into the inner structure.

* * * * *